United States Patent [19]

Halasa et al.

[11] 4,148,984

[45] Apr. 10, 1979

[54] CATALYST SYSTEM AND PROCESS FOR POLYMERIZATION OF CONJUGATGED DIENES THEREWITH

[75] Inventors: Adel F. Halasa, Bath; James E. Hall, Akron, both of Ohio

[73] Assignee: The Firestone Tire & Rubber Company, Akron, Ohio

[21] Appl. No.: 900,362

[22] Filed: Apr. 26, 1978

Related U.S. Application Data

[62] Division of Ser. No. 809,819, Jun. 24, 1977, Pat. No. 4,107,081.

[51] Int. Cl.$^2$ ............................ C08F 4/08; C08F 4/52; C08F 36/04; C08F 36/06
[52] U.S. Cl. .................... 526/187; 252/428; 252/430; 252/431 R; 252/431 C; 252/431 L; 252/431 N
[58] Field of Search ............................................ 526/187

[56] References Cited

U.S. PATENT DOCUMENTS

| | | | |
|---|---|---|---|
| 3,254,067 | 5/1966 | Chiang | 526/187 |
| 3,285,894 | 11/1966 | Lim et al. | 252/431 L X |
| 3,380,979 | 4/1968 | Chiang | 526/187 |
| 3,429,861 | 2/1969 | Chiang et al. | 526/187 |
| 3,448,092 | 6/1969 | Chiang | 526/187 |
| 3,526,604 | 9/1970 | Wadsworth | 526/187 |
| 3,631,006 | 12/1971 | Hawkins | 526/187 |
| 3,852,309 | 12/1974 | Simmons et al. | 252/431 L X |
| 3,894,075 | 7/1975 | Schoen | 252/431 L X |

*Primary Examiner*—William F. Hamrock

[57] ABSTRACT

The catalyst system disclosed herein comprises one suitable for the polymerization of a conjugated diene, which system comprises a trihydrocarbyl aluminum compound, in which the hydrocarbyl group is an alkyl, aryl or cycloalkyl radical of 1-10 carbon atoms, and an alkali metal compound of the formula M—Y—R wherein M represents Li, Na or K; Y represents O, S or NR$^1$; R represents H or a hydrocarbyl group of 1-10 carbon atoms; R$^1$ represents a hydrocarbyl group of 1-10 carbon atoms, an acyl group of 1-10 carbon atoms; and when Y is NR$^1$ the R and R$^1$ can represent divalent groups so that together they form, with the N, a cyclic radical such as piperdyl, morpholino or diethylene diamino. Lithium alkoxides are preferred forms of the MYR formula and Al(CH$_3$)$_3$ and Al(C$_2$H$_5$)$_3$ are preferred aluminum components.

4 Claims, No Drawings

4,148,984

CATALYST SYSTEM AND PROCESS FOR POLYMERIZATION OF CONJUGATGED DIENES THEREWITH

This is a division of application Ser. No. 809,819 filed June 24, 1977, now U.S. Pat. No. 4,107,081.

BACKGROUND OF THE INVENTION

1. Field of the Invention:

This invention relates to a process for the preparation in high yield of a conjugated diene polymer of at least 70% diene. More specifically, it relates to the polymerization of a conjugated diene in a system comprising a trihydrocarbyl aluminum and an alkali metal compound such as a lithium alkoxide.

2. Related Prior Art:

One of the present inventors was a co-inventor in a number of polymerization processes described in U.S. Pat. Nos. 3,635,922; 3,644,312; 3,644,313; 3,692,883; 3,718,638; 3,769,267; 3,775,392 and Reissue 27,878. For these polymerizations, catalyst systems are described which comprise a combination of an alkali metal or an alkali metal hydrocarbyl compound with an alkali metal hydroxide or alkoxide. The alkali metal or alkali metal hydrocarbyl per se was previously known to be a polymerization initiator for dienes. In these prior cases the alkali metal alkoxide or hydroxide is a modifier for the polymerization effected by the alkali metal or the alkali metal hydrocarbyl compound.

U.S. Pat. No. 3,526,604 shows polymerization systems in which Al trialkyls are used with Group IA and IIA metals and organometal compounds of these metals in which the metal is bonded directly to a carbon atom. In a specific listing of possible combinations of Group IA metals with Al trialkyls, sodium isopropoxide is listed as a possible three component combination with the Na metal and an Al trialkyl. Here again, the isoproxide is being used as a modifier, since the teaching is clear that the Na metal in combination with the Al trialkyl is the polymerization initiator. There is no indication that the combination would initiate polymerization in the absence of the sodium metal.

U.S. Pat. Nos. 2,856,391; 3,294,768 and 3,285,894 each show polymerization of dienes in the presence of the combination of an alkyl lithium and an alkali metal alkoxide. Here again, the alkyl lithium is a known polymerization catalyst and the alkoxide is merely a modifier.

Neither Al trihydrocarbyl compounds by themselves nor alkali metal hydroxides, alkoxides, mercaptides, alkylsulfides and amides by themselves are effective in initiating and propagating polymerization of conjugated dienes.

SUMMARY OF THE INVENTION

In accordance with the present invention, although neither Al trihydrocarbyl compounds nor alkali metal compounds of the formula MYR are effective polymerization initiators of conjugated dienes, it has been found that the combination of these two types of compounds is very effective for this purpose. Therefore very effective catalyst systems for the polymerization of conjugated dienes has been found to comprise the combination of (1) an aluminum trihydrocarbyl compound, and (2) an alkali metal compound, preferably of Li, Na or K, having the formula MYR where M represents the alkali metal; Y represents O, S or $NR^1$; R represents hydrogen or a hydrocarbyl group of 1–10 carbon atoms, preferably alkyl; and $R^1$ represents a hydrocarbyl group of 1–10 carbon atoms or an acyl group of 1–10 carbon atoms; and when Y is $NR^1$, the R and $R^1$ groups can together represent a divalent group so that they can form with the N a cyclic radical such as piperdyl, morpholino or diethylene diamino. Lithium alkoxides are preferred forms of the MYR formula and $Al(CH_3)_3$ and $Al(C_2H_5)_3$ are preferred aluminum components.

The hydrocarbyl portion of the Al trihydrocarbyl compound may be alkyl, aryl or cycloalkyl. Preferably these are low molecular weight alkyl such as $Al(CH_3)_3$, $Al(C_2H_5)_3$, $Al(C_3H_7)_3$ and $Al(C_4H_9)_3$. The aluminum trihydrocarbyl compounds and methods for their preparation are known in the art.

The alkali metal compounds of the formula MYR include the Li, Na and K hydrocaryloxides, such as the aryloxides, the cycloalkyloxides and preferably the alkyloxides; the hydroxides; the thiols, the sulfides; the amines and the amides which fit the above-defined MYR formula. Tertiary alkyloxides such as the tertiary butoxides are preferred.

Typical alkali metal compounds suitable for the practice of this invention include the Li, Na and K methoxides, ethoxides, n-propoxides, isoproxides, n-butoxides, sec-butoxides, tertiary-butoxides, n-amyloxide, sec.-amyloxide, tertiaryamyloxide, hexyloxides, heptyloxides, octyloxides, nonyloxides, decyloxides, phenyloxides, tolyloxides, naphthyloxides, cyclohexyloxides, cycloheptyloxides, hydroxides, thiols, sulfides, e.g. ethylsulfides, butylsulfides, hexyl sulfides, decyl sulfides, phenyl sulfides, tolyl sulfides, cyclohexyl sulfides, cycloheptyl sulfides, etc.; amines, such as N-Li methylamine, N-Na ethylamine, N-K butylamine, N-Li butylamine, N-Na amylamine, N-Li phenylamine, N-Na cyclohexyl amine, etc., and amides, such as N-Li acetylamide, N-Na butyroamide, N-K octoamide, N-Li, N-methyl acetylamide, N-Li benzoylamide, N-Na toluamide, N-Li cyclohexoamide, N-Li morpholine, N-Li piperidine, N-Na morpholine, N-K morpholine, N-Na piperidine, N-Li diethylenediamine, $N,N^1$-dilithium diethylenediamine, N-Na $N^1$-methyl diethylene diamine, etc.

These MYR compounds are produced by methods known in the art. For example, the hydrocarbyl oxides and sulfides are prepared by reaction of the alkali metal with the appropriate alcohol, phenol, mercaptan, etc. The hydroxides and thiols may be available commercially or may be prepared by controlled reaction by the gradual addition of water of $H_2S$ to a suspension of finely divided alkali metal in toluene. The amines and amides are prepared by the reaction of an alkali metal with an amine or amide having hydrogen attached to the nitrogen atom.

The molecular weight range of the products depends on the number of alkali metal atoms present per weight of monomer. The products generally have a range of molecular weights of 50,000 to 500,000, preferably 100,000 to 250,000.

While neither the MYR compounds, such as the alkoxides, or trihydrocarbyl compounds are effective by themselves in giving suitable polymerization of conjugated dienes, the combination apparently gives a complex which effectively initiates and propagates the polymerization of conjugated dienes.

For most effective results, the aluminum/alkali molar ratio, sometimes referred to herein as Al/Li ratio, is generally in the range of 0.1/1 to 10/1, preferably in the range of 0.25/1 to 2/1; and the concentration of the aluminum compound is generally in the range of 1-6 millimoles (mM) per hundred grams (phg) of monomer, preferably 2-3 mM phg.

With a lithium catalyst combination the temperature is advantageously in the range of 190°-280° F. (88°-138° C.), preferably 200°-265° F. (93°-129° C.), whereas with a K or Na catalyst combination, the temperature is advantageously in the range of 150°-260° F. (65°-127° C.), preferably 150°-190° F. (65°-88° C.). Overall, the temperature should be in the range of 150°-280° F. (65°-138° C.).

Generally, the induction period and the rate of polymerization is affected by the concentration of the alkali metal component, with faster initiation and faster rate being promoted by higher concentration of the alkali metal component. Normally the induction period takes 1-2 hours and the reaction is generally completed with substantially complete conversion in 2-6 hours.

The use of the catalyst system of this invention has a number of advantages. (1) High temperature polymerization can be effected without the gel formation often accompanying high temperature polymerizations. (2) Because of the ability to effect polymerization to high molecular weights at high temperatures, it is not necessary to remove or dissipate heat from the reaction. (3) High product-throughput is permitted. (4) The product does not phase out or precipitate from the solution. (5) The product has a broad molecular weight distribution and improved processability. (6) The product is useful in high impact styrene polymers because of its exposure to high temperature in its preparation. (7) Its highly branched character makes it desirable for use in the manufacture of tires and other rubber-fabricated products. (8) The molecular weight is controllable by catalyst proportions.

When the catalyst composition has a lithium compound as the MYR component, such as Li T-butoxide, the vinyl or 1,2 content of the polymer is generally at a low range, for example, 10-14%. When the alkali metal component is a sodium or potassium compound, the vinyl content is generally in the range of 30-50%, for example Na t-butoxide with trimethyl Al gives 30-40% 1,2 and K t-butoxide with trimethyl Al gives 40-50% 1,2. The lithium catalyst combination gives a narrower molecular weight range than either a sodium or a potassium catalyst combination.

The polymerization is advantageously effected in the presence of 10-90% preferably 20-80% of an inert diluent to facilitate handling of the polymer and to give better temperature control. Normally liquid hydrocarbons are preferred for this purpose, such as benzene, toluene, saturated aliphatic hydrocarbons preferably of the straight chain variety, such as n-hexane, n-heptane, etc. The polymerization is advantageously conducted in a pressure vessel to avoid loss of monomer and solvent, particularly since temperatures are generally used at or above the boiling point of either. Moreover, an inert atmosphere such as nitrogen is used, and the usual precautions are taken to exclude materials such as water and air that will inactivate or poison the catalyst combination.

Conjugated dienes that may be polymerized, either alone or with each other, in accordance with this invention include: 1,3-butadiene, isoprene, chloropreme, 2-phenyl-1,3-butadiene, piperylene, etc.

Although butadiene homopolymers are preferred in the practice of this invention, butadiene copolymers can also be prepared where the comonomers impart desirable properties and do not detract from the polymer properties. The comonomers may be olefins, such as butene-1, n-butene-2, isobutylene, n-pentene-1, n-pentene-2 and the like, and preferably vinyl arenes, including vinyl aryl or isopropenyl aryl compounds or derivatives thereof having alkyl, aralkyl, cycloalkyl or chlorine attached to the aromatic nucleus, and preferably having no more than 20 carbon atoms. Typical of these aromatic comonomers are styrene, alphamethyl styrene, vinyl toluene, isopropenyl toluene, ethyl styrene, p-cyclohexyl styrene, o-, m- and p-Cl-styrene, vinyl naphthalene, vinyl ethyl naphthalene, vinyl methyl naphthalene, vinyl butyl naphthalene, isopropenyl naphthalene, isopropenyl methyl naphthalene, 1-vinyl-4-chloronaphthalene, 1-isopropenyl-5-chloronaphthalene, vinyl diphenyl, vinyl diphenylethane, 4-vinyl-4'-methyldiphenyl, 4-vinyl-4'-chlorodiphenyl, and the like. Preferably such comonomers have no more than 12 carbon atoms. Where such comonomers are to be used, generally at least 1%, preferably at least 5% by weight, should be used and as much as 60%, preferably no more than 30% may be used.

In referring above to millimoles of catalyst this corresponds to the millimoles of aluminum component since the catalyst is regarded or at least calculated as a complex of the Al compound and the alkali metal compound.

The "dilute solution viscosity" (DSV) referred to herein is defined as the inherent viscosity determined at 25° C. on a 0.4% solution of the polymer in toluene. It is calculated by dividing the natural logarithm of the relative viscosity by the percent concentration of the solution, i.e., it is the inherent viscosity measured at 0.4% concentration. The molecular weights reported herein are determined from these viscosities.

SPECIFIC EMBODIMENTS OF INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

Into a one-gallon stainless steel reactor equipped with means for maintaining a pressurized atmosphere, agitator, and inlet and outlet means, there is charged under nitrogen 500 grams of butadiene as a hexane-butadiene-1,3 blend containing 23.4% butadiene, 10 millimoles of trimethyl aluminum followed by various amounts of lithium t-butoxide to give varying Al/Li ratios respectively. The reactor temperature is raised to about 250° F. and maintained at 250°-255° F. for a period of 6 hours. As polymerization starts the solution changes to a bluish tint and then gray. Polymerization at the beginning is slow and after an induction period, proceeds rapidly. After the polymerization period, the reaction mass is dropped into an equal volume or more of isopropanol containing 0.1% antioxidant (p-t-butyl-cresol). The resultant precipitate is drum dried and then analyzed with the results shown in the table below.

| Run No. | A | B | C | D |
|---|---|---|---|---|
| Al(CH$_3$)$_3$ mM phgr | 2.0 | 2.0 | 2.0 | 2.0 |

-continued

| Run No. | A | B | C | D |
|---|---|---|---|---|
| Li t-BuO | | | | |
| mM phgr | 1.0 | 2.0 | 3.0 | 4.0 |
| Al/Li Ratio | 2/1 | 1/1 | 0.67/1 | 0.5/1 |
| Polym. Temp. ° F. | 265° | 260° | 260° | 255° |
| Conversion | 65%* | 94% | 100% | 100% |
| Polymer structure: | | | | |
| 1,2 (%) | 12.9 | 12.0 | 12.0 | 11.7 |
| Cis-1,4 (%) | 33.4 | 33.4 | 33.3 | 33.5 |
| Trans-1,4 (%) | 54.2 | 54.6 | 54.8 | 54.9 |

*Polymerization not initiated within 6 hours, but started while left on overnight and continued through next night. Some gel-like material remained in reactor.

EXAMPLE II

The procedure of Example I is repeated a number of times with similar results using in place of the Li t-$C_4H_9O$ an equivalent amount respectively of Li OH, Li t-$C_5H_{11}O$, Li SH, Li $C_6H_5O$, Li $C_6H_{11}O$, Li S(n-$C_4H_9$), N-Li morpholine, N-Li piperidine, N-Li acetamide, and N-Li ethyl amine.

EXAMPLE III

The procedure of Example I is repeated a number of times using 3 millimoles of Al($CH_3$)$_3$ phgr of monomer and 6 millimoles phgr of potassium t-amylate with results as tabulated below:

| Run No. | E | F | G |
|---|---|---|---|
| Al($CH_3$)3 mM/phgr | 3.0 | 3.0 | 3.0 |
| K t-$C_5H_{11}O$ mM/phgr | 6.0 | 6.0 | 6.0 |
| Al/K Ratio | 0.5/1 | 0.5/1 | 0.5/1 |
| Polym. Temp ° F. | 200° F. | 150° F. | 125° F. |
| Conversion | 94.4% | 89.7% | 97.4% |
| Polymer Structure: | | | |
| 1,2 (%) | 38.8 | 48.2 | 53.5 |
| Cis-1,4 (%) | 22.2 | 19.3 | 17.1 |
| Trans-1,4 (%) | 39.0 | 32.5 | 29.4 |

EXAMPLE IV

The procedure of Example III is repeated a number of times with similar results using in place of the K t-amylate equivalent amounts respectively of Na t-amylate, KOH, NaSH, KS$C_8H_{17}$, NaS(n-$C_5H_{11}$), N-Na morpholine, N-K diethylenediamine, N-Na propionamide and K phenylamine.

EXAMPLE V

The procedure of Example I is repeated twice using 4.20 millimoles of triethyl aluminum per hundred grams of butadiene together with varying amounts of K t-amylate, with the results shown tabulated below;

| Run No. | H | I |
|---|---|---|
| Al($C_2H_5$)3 mM/phgr | 4.20 | 4.20 |
| K t-$C_5H_{11}O$ mM/phgr | 14.0 | 18.5 |
| Al/K | 0.3/1 | 0.227/1 |
| Polym. Temp. ° F. | 150° | 150° |
| Conversion | 100% | 100% |
| Polymer Structure: | | |
| 1,2 (%) | 51.7 | 51.3 |
| Cis-1,4 (%) | 17.7 | 17.6 |
| Trans-1,4 (%) | 39.6 | 31.10 |

EXAMPLE VI

The procedure of Example V is repeated a number of times with similar results using in place of the triethyl aluminum, an equivalent amount respectively of tri n-amyl aluminum, tri n-decyl aluminum, triphenyl aluminum and tricyclohexyl aluminum.

EXAMPLE VII

The procedure of Example I is repeated twice with similar results using in place of the butadiene, equivalent amounts respectively of isoprene and piperylene.

EXAMPLE VIII

The procedure of Example I is repeated a number of times successfully by replacing the diene monomer composition with the following monomer compositions:
  (a) 70% butadiene - 30% styrene
  (b) 70% isoprne - 30% styrene
  (c) 80% butadiene - 20% vinyl toluene
  (d) 80% butadiene - 20% alphamethylstyrene
  (e) 75% isoprene 25% p-Cl-styrene While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. The process for the hydrocarbon solution polymerization of a monomer composition containing at least 70 percent by weight of a conjugated diene to a polymer having no more than 55 percent 1,2-microstructure comprising the steps of maintaining said monomer at a temperature of 150°-280° F. and in intimate contact with a catalyst composition consisting essentially of
  (a) a trihydrocarbyl aluminum compound in which the hydrocarbyl radicals have 1-10 carbon atoms selected from the class consisting of alkyl, aryl and cycloalkyl radicals; and
  (b) an alkali metal compound of the formula M—Y—R, wherein M represents Li, Na, or K; Y represents O,S or NR[1]; R represents H or a hydrocarbyl radical of 1-10 carbon atoms; R[1] represents a hydrocarbyl or acyl radical of 1-10 carbon atoms, except that when Y is NR[1], the R and R[1] can each represent divalent groups so that together they form with the N a piperidyl, morpholino or diethylene diamino group; the concentrations of the respective components giving an Al/alkali metal molar ratio of 0.1/1 to 10/1, and said aluminum component being present in a concentration of 1-6 millimoles per 100 grams of monomer.

2. The process of claim 1 in which said M—Y—R compound is a lithium alkoxide and said temperature is in the range of 190°-280° F.

3. The process of claim 2 in which said M—Y—R compound is Li t-butoxide or Li t-amylate.

4. The process of claim 3 in which said trihydrocarbyl aluminum compound is trimethyl, triethyl, tripropyl or tributyl aluminum.

* * * * *

UNITED STATES PATENT OFFICE
CERTIFICATE OF CORRECTION

Patent No. 4,148,984　　　　Dated April 10, 1979

Inventor(s) Adel F. Halasa and James E. Hall

It is certified that error appears in the above-identified patent and that said Letters Patent are hereby corrected as shown below:

Column 1, line 38

"isoproxide" should be -- isopropoxide --

Column 2, line 18

"hydrocaryloxides" should be -- hydrocarbyloxides --

Column 3, line 38

"T-butoxide" should be -- t-butoxide --

Column 6, line 20

"isoprne" should be -- isoprene --

Signed and Sealed this

Fourth Day of March 1980

[SEAL]

Attest:

SIDNEY A. DIAMOND

Attesting Officer　　Commissioner of Patents and Trademarks